(12) United States Patent
Campbell et al.

(10) Patent No.: US 6,526,459 B1
(45) Date of Patent: Feb. 25, 2003

(54) ALLOCATION OF INPUT/OUTPUT BUS ADDRESS SPACE TO NATIVE INPUT/OUTPUT DEVICES

(75) Inventors: Paul Campbell, Oakland, CA (US); Ali Alasti, Los Altos, CA (US)

(73) Assignee: ATI International SRL, Barbados (KN)

( * ) Notice: Subject to any disclaimer, the term of this patent is extended or adjusted under 35 U.S.C. 154(b) by 0 days.

(21) Appl. No.: 09/438,573

(22) Filed: Nov. 10, 1999

(51) Int. Cl.[7] .................. G06F 13/14; G06F 13/20; G06F 13/36
(52) U.S. Cl. .................. 710/51; 710/3; 710/36; 710/37; 710/38
(58) Field of Search .................. 710/3, 36, 38, 710/37, 51

(56) References Cited

U.S. PATENT DOCUMENTS

| | | | | |
|---|---|---|---|---|
| 5,931,920 A | * | 8/1999 | Ghaffari et al. | 710/22 |
| 6,061,753 A | * | 5/2000 | Ericson | 710/107 |
| 6,112,263 A | * | 8/2000 | Futral | 709/229 |
| 6,112,281 A | * | 8/2000 | Bamford et al. | 709/213 |
| 6,408,373 B2 | * | 6/2002 | Burger et al. | 711/207 |

OTHER PUBLICATIONS

IBM TDB, 'Transparent Access to Local or Remote I/O Via Various Channels and/or Links', vol. 31, No. 6, pp. 220–227, Nov. 1988.*

* cited by examiner

Primary Examiner—Jeffrey Gaffin
Assistant Examiner—Rehana Perveen
(74) Attorney, Agent, or Firm—Vedder, Price, Kaufman & Kammholz

(57) ABSTRACT

A method and apparatus is provided for providing communication with input/output devices without being bound by the limitations of an existing input/output bus while still providing compatibility with software intended to communicate with input/output devices using the existing input/output bus. The software image of the input/output devices as being associated with the input/output bus is preserved, but a technique is provided to allow communication with the input/output devices to bypass the existing input/output bus. A translation lookaside buffer is utilized to remap accesses to an internal input/output device from virtual address space for input/output-bus-based input/output devices to physical address space for the internal input/output device. Circuitry for interfacing with the input/output devices separately from the existing input/output bus may be fabricated as a single integrated circuit device along with other system components, such as a central processing unit.

9 Claims, 7 Drawing Sheets

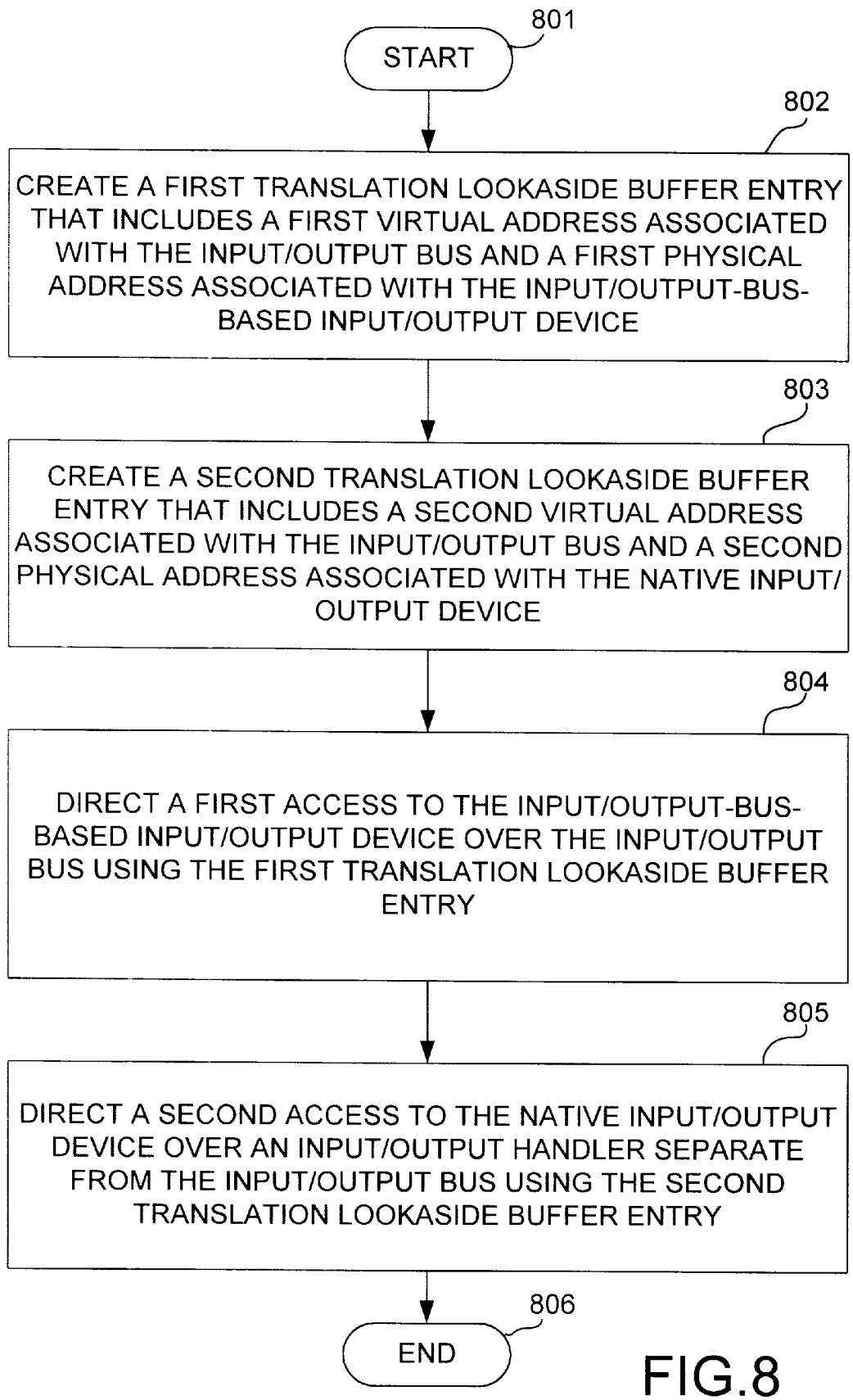

ALLOCATION OF INPUT/OUTPUT BUS ADDRESS SPACE TO NATIVE INPUT/OUTPUT DEVICES

TECHNICAL FIELD OF THE INVENTION

The invention relates generally to computer memory management techniques and more specifically to allocation of memory space for input/output (I/O) devices in a computer system.

BACKGROUND OF THE INVENTION

In traditional computer systems, such as those employing a peripheral component interconnect (PCI) bus, I/O devices are coupled to the system by a bus such as the PCI bus. Software programmed to interact with the I/O devices uses memory space allocated according to the bus standard for such interaction. For example, I/O devices on a PCI bus are allocated memory space at a specific location for interaction with the rest of the system.

FIG. 1 is a block diagram illustrating a prior art system. The system comprises software 101, an x86 processor 102, a north bridge 103, a dynamic random access memory (DRAM) 104, a display D 105, a south bridge 106, an input/output (I/O) device X 107, an I/O device Y 108, and an I/O device Z 109. The software 101 is executed on the x86 processor 102, which is coupled to the north bridge 103. The north bridge 103 is coupled to the DRAM 104 and the display D 105. The north bridge 103 is coupled to the south bridge 106 via a peripheral component interconnect (PCI) bus. The north bridge 103 provides an interface between the x86 processor 102 and the PCI bus. The I/O device X 107, the I/O device Y 108, and the I/O device Z 109 are also coupled to the north bridge 103 via the PCI bus. The south bridge 106 provides support for other peripheral devices, for example by providing a universal serial bus (USB) interface and an integrated drive electronics (IDE) interface. In this case, the south bridge 211 serves to couple the PCI bus to the USB interface and the IDE interface.

FIG. 4 is a diagram illustrating a prior art memory map. In four gigabytes of address space, the lower 32 megabytes is allocated as DRAM address space 401, while the remaining address space is allocated as PCI memory address space 402. The PCI memory address space 402 serves as memory space for interaction with I/O devices on a PCI bus. A number of disadvantages arise from allocating address space in this manner. For example, since the PCI memory address space 402 needs to be organized in a predictable manner to allow interaction with I/O devices on the PCI bus, the organization of PCI memory address space 402 is heavily constrained. It is difficult to support I/O devices that do not closely conform to the PCI standard. The rigidity of the allocation of PCI memory address space 402 also puts constraints on DRAM address space 401 and limits the expansion of DRAM address space 401.

The x86 processor 102 accesses I/O device X 107 through a physical address X, I/O device Y 108 through a physical address Y, and I/O device Z 109 through a physical address Z. Physical addresses X, Y, and Z are located in PCI memory address space 402. Since the prior art memory map provides only for DRAM address space 401 and PCI memory address space 402, no support is provided for I/O devices that are not coupled through the PCI bus.

As the performance requirements for computer systems continue to increase, previously established standards for computer system design begin to impede attempts at increasing computer system performance. The limitations of the memory map of FIG. 4 impair attempts to integrate new I/O devices into the system without using the existing PCI bus. Thus, a new technique is needed for allocating memory space to I/O devices in a computer system.

BRIEF DESCRIPTION OF THE DRAWINGS

FIG. 8 is a flow diagram illustrating a process according to an embodiment of the invention.

DETAILED DESCRIPTION OF A PREFERRED EMBODIMENTS

While a typical computer system uses a PCI bus to communicate with I/O devices, the PCI bus imposes limitations on system performance. An embodiment of the present invention allows the limitations of the PCI bus to be overcome while still providing compatibility with software intended for use with PCI-bus-based I/O devices. This embodiment preserves the software image of the I/O devices as PCI-bus-based I/O devices, but allows communication with the I/O devices to bypass the PCI bus. This embodiment also allows circuitry for interfacing with the I/O devices separately from the PCI bus to be fabricated as a single integrated circuit device along with other system components, such as a central processing unit (CPU).

Figure 1:
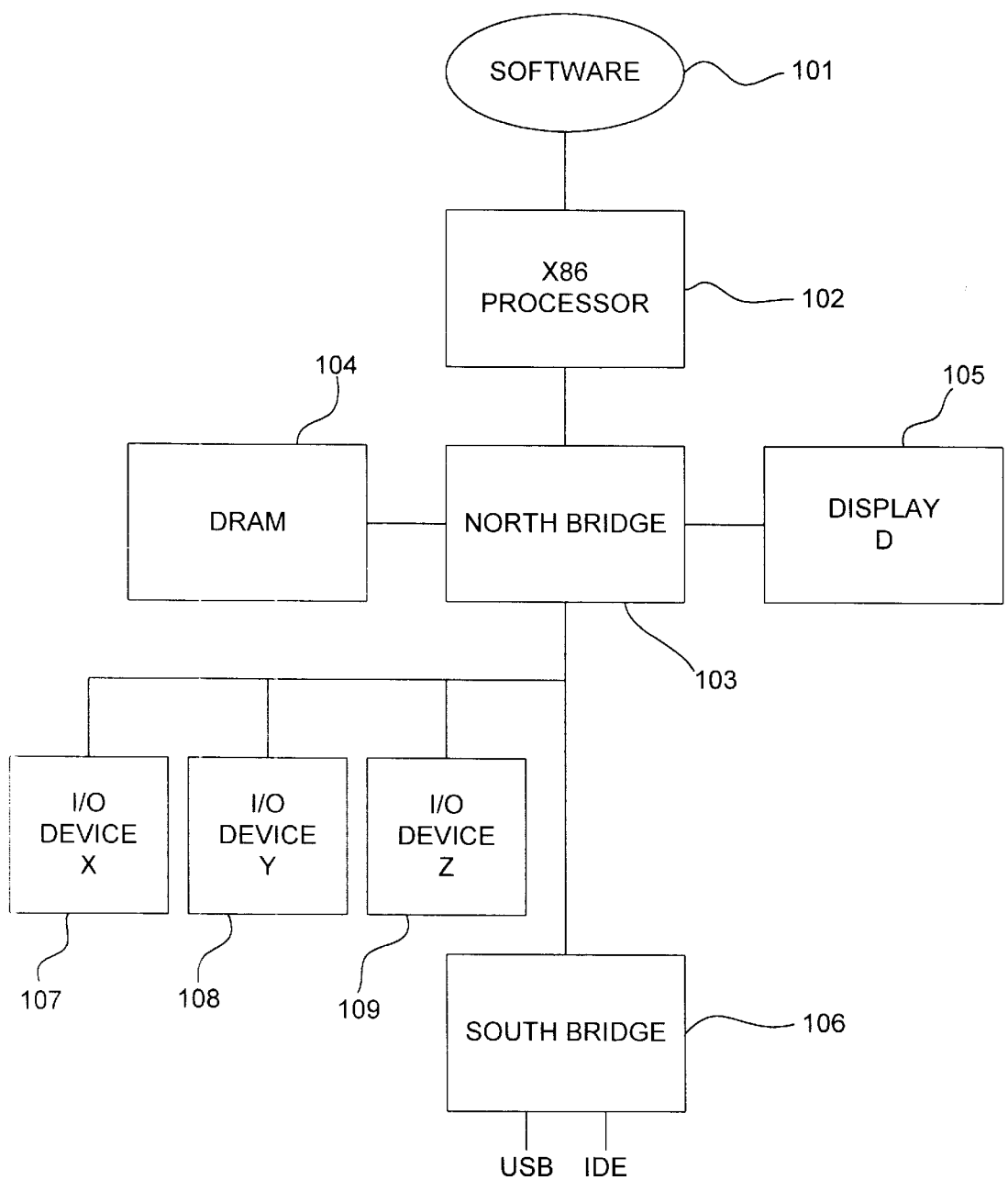
FIG. 1 is a block diagram illustrating a prior art system.
Figure 2:
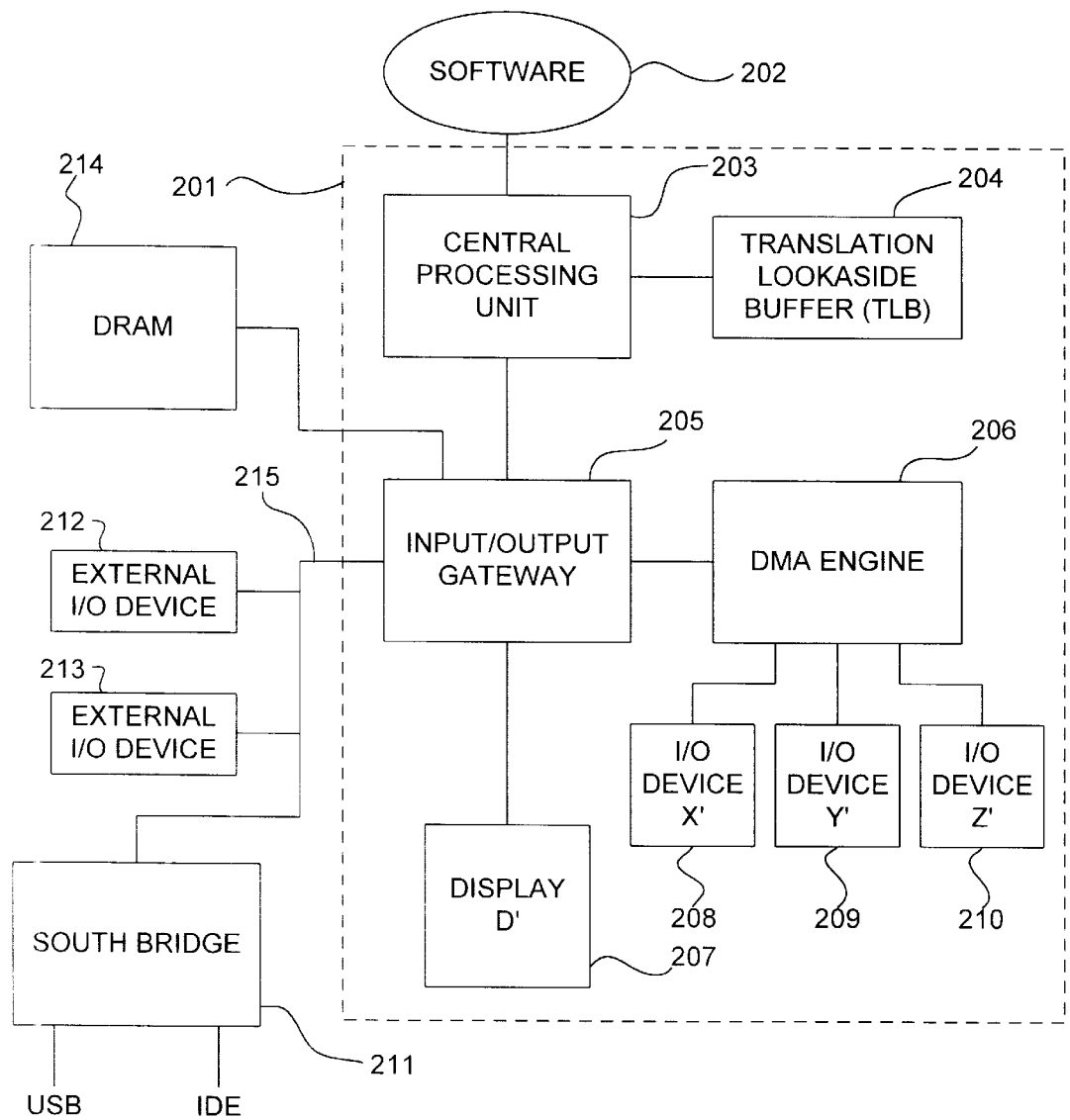
FIG. 2 is a block diagram illustrating a system according to an embodiment of the invention.

FIG. 2 is a block diagram illustrating a system according to an embodiment of the invention. In this system, software 202 is executed on a CPU 203, which is coupled to a translation lookaside buffer (TLB) 204 and to an input/output gateway 205. The input/output gateway 205 is coupled to a DRAM 214, to a display D' 207, and to direct memory access (DMA) engine 206. The DMA engine 206 is coupled to an I/O device X' 208, an I/O device Y' 209, and an I/O device Z' 210.

In one embodiment of the invention, CPU 203, TLB 204, input/output gateway 205, and DMA engine 206 are fabricated as a single integrated circuit device 201. The interface circuitry for the I/O device X' 208, the I/O device Y' 209, the I/O device Z' 210, and/or the display D' 207 may also be fabricated on the same single integrated circuit device 201. Thus, the I/O device X' 208, the I/O device Y' 209, and the I/O device Z' 210 may be thought of as internal devices, in that they have circuitry internal to the single integrated circuit device 201. These I/O devices may also be considered to be native I/O devices in that they communicate using a communication path that is native to the single integrated circuit device 201 rather than an I/O bus, such as a PCI bus. It should be noted that the invention may also be practiced without the circuitry fabricated as a single integrated circuit device.

The input/output gateway 205 is also coupled to a south bridge 211 by way of an external I/O bus 215 that may be external to the single integrated circuit device 201. External I/O devices 212 and 213 are external in that they are coupled by the external I/O bus 215 to the input/output gateway 205. The external I/O devices may also be considered to be I/O-bus-based I/O devices since they communicate using the external I/O bus 215.

While software 201 is executed on the CPU 203, other elements of the system may be provided with processing capability and may execute software as well. A memory device may be coupled to the CPU 203, the input/output gateway 205, or to the DMA engine 206 for storing data. One example of such a memory device is DRAM 214. The DMA engine allows DMA operations to be performed with respect to the memory device without the need for intervention by the CPU 203. While the memory device is organized according to physical addresses in physical memory space, the CPU 203 utilizes virtual addresses in virtual memory space. The TLB 204 provides a cache to store translations between virtual addresses and physical addresses.

The input/output gateway 205 allows the CPU 203 to communicate with a plurality of different types of input/output devices, such as those coupled to the DMA engine 206, display D' 207, and the external I/O devices 212 and 213 coupled to the external I/O bus. With the assistance of the south bridge 211, the input/output gateway 205 also allows communication with other devices, for example using a USB interface or an IDE interface.

Figure 3:
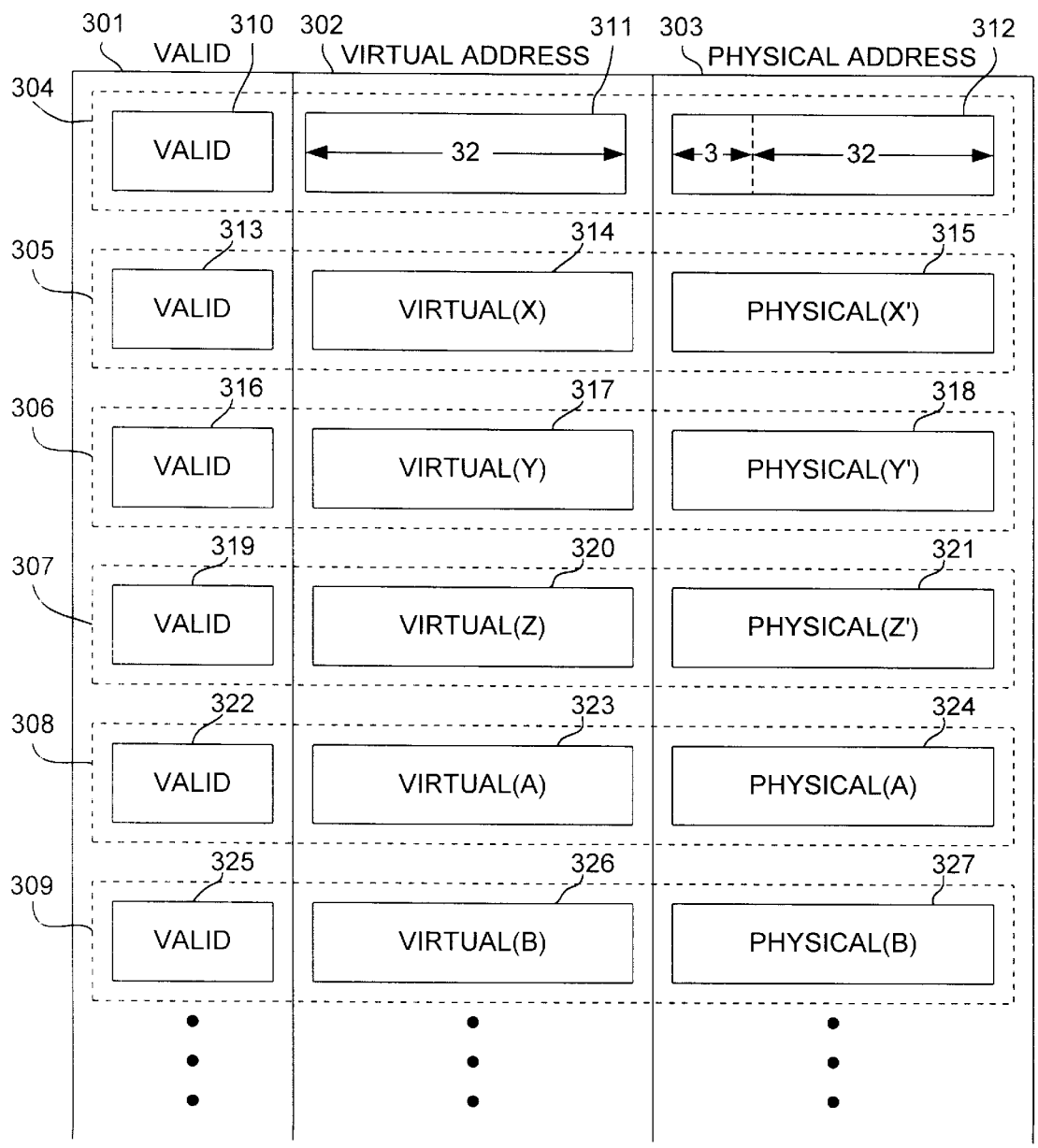
FIG. 3 is a diagram illustrating a translation lookaside buffer structure according to one embodiment of the invention.
Figure 4:
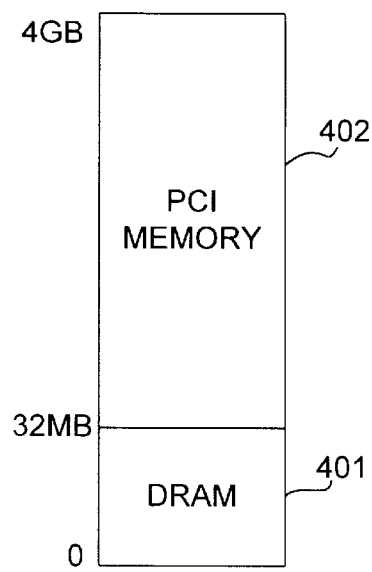
FIG. 4 is a diagram illustrating a prior art memory map.

FIG. 3 is a diagram illustrating a TLB structure according to one embodiment of the invention. The TLB structure includes a plurality of entries 304, 305, 306, 307, 308, and 309. For each entry, the TLB includes validity information 301, indicating the status of the entry, as well as a virtual address 302 and a physical address 303 to which the virtual address 302 is mapped. For example, entry 304 includes validity information 310, virtual address 311, and physical address 312. In one embodiment, the virtual address may be a 32-bit address, and the physical address may include both a 32-bit address and additional bits, for example three additional bits. The additional bits are used to identify different address spaces allocated to different types of addressing usage.

Figure 5:
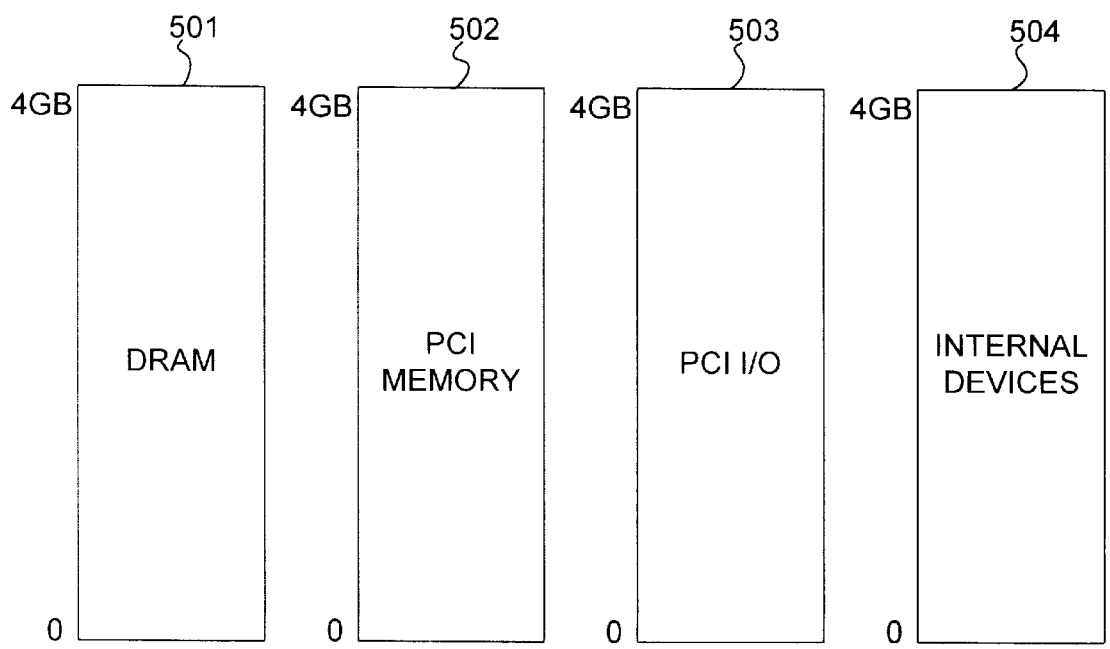
FIG. 5 is a diagram illustrating a memory map according to an embodiment of the invention.

FIG. 5 is a diagram illustrating a memory map according to an embodiment of the invention. In this embodiment, several different address spaces are provided and include DRAM address space 501, PCI memory address space 502, PCI I/O address space 503, and internal device address space 504. These different address spaces are allocated according to the particular addressing needs. For example, DRAM address space 501 is allocated to DRAM accessible to the central processing unit 203. PCI memory address space 502 and PCI I/O address space 503 are allocated for the memory and I/O needs of PCI /O devices, such as PCI I/O device 212 and PCI I/O device 213. Internal device address space 504 is allocated for use by internal I/O devices, such as I/O device X' 208, I/O device Y' 209, and I/O device Z' 210.

The separate different address spaces may be maintained as separate and distinct using the additional bits of the physical address 303. For example, by using a 32-bit physical address with three additional bits, eight different address spaces, each of four gigabytes, can be defined and maintained. The 32-bit physical address uniquely identifies a particular address within a four gigabit address space, while the three additional bits identify which of eight possible address spaces is being addressed.

Different permutations of the three additional bits may be assigned to each type of address space. For example, the bit pattern "000" may be used denote DRAM address space 501, the bit pattern "100" may be used to denote PCI memory address space 502, the bit pattern "101" may be used to denote PCI I/O address space 503, and the bit pattern "011" may be used to denote internal device address space 504. The bit patterns "001," "110," and "111" may be used to denote address spaces for DRAM controller initialization, PCI configuration address space, and PCI special address space. The remaining bit pattern, "010," may be used to denote another type of address space.

The relationship between the various aspects of the embodiments of the invention illustrated in FIGS. 2, 3, and 5 can be readily appreciated. For example, an internal device may be allocated a portion of internal device address space 504, and the corresponding translation of virtual address space to physical address space for that portion of internal device address space 504 may be stored in the TLB structure illustrated in FIG. 3.

Referring specifically to I/O device X' 208 as an example, a TLB entry 305 is created containing validity information 313, virtual address (X) 314, and physical address (X') 315. As described with respect to FIG. 3, the virtual address (X) 314 may comprise a 32-bit address and the physical address (X') may comprise a 32-bit address plus three additional bits. The three additional bits identify the physical address (X') 315 as being located in internal device address space 504.

Likewise for I/O device Y' 209, TLB entry 306 is created with validity information 316, virtual address (Y) 317, and physical address (Y') 318. The physical address (Y') 318 comprises the three additional bits to identify the physical address (Y') 318 as being located in internal device address space 504. Similarly, TLB entry 307 is created for I/O device Z' 210 with validity information 319, virtual address (Z) 320, and physical address (Z') 321. The physical address (Z') 321 comprises the three additional bits to identify the physical address (Z') 321 as being located in internal device address space 504.

A TLB entry 308 is created for the portion of the PCI memory address space 502 associated with external I/O device 212 with validity information 322, virtual address (A) 323, and physical address (A) 324. The physical address (A) 324 comprises three additional bits to denote that the physical address (A) 324 is located in PCI memory address space 502. A separate TLB entry may be provided to map the virtual address for the portion to the PCI I/O address space 503 associated with external I/O device 212 to its corresponding physical address.

A TLB entry 309 is created for the portion of the PCI memory address space 502 associated with external I/O device 213 with validity information 325, virtual address (B) 326, and physical address (B) 327. The physical address (B) 327 comprises three additional bits to denote that the physical address (B) 327 is located in PCI memory address space 302. A separate TLB entry may be provided to map the virtual address for the portion to the PCI I/O address space 503 associated with external I/O device 213 to its corresponding physical address.

In addition to the role of the TLB in providing translation of virtual addresses to physical address, an embodiment of the invention uses the TLB to remap virtual addresses usually associated with external I/O devices to internal device address space 504. This allows internal I/O devices to emulate external I/O devices, thereby providing compatibility of internal I/O devices with software programmed to interact with external I/O devices.

For example, TLB entry 305 remaps virtual address (X) 314 to physical address (X') 315. Although address X would normally be located in PCI memory address space 402, TLB entry 305 remaps address X to address X', which is in internal device address space 504. TLB entry 306 remaps virtual address (Y) 317 to physical address (X') 318, and TLB entry 307 remaps virtual address (Z) 320 to physical address (Z') 321. Thus, I/O device X' can be accessed through address X, I/O device Y' can be accessed through address Y, and I/O device Z' can be accessed through address Z.

Figure 6:
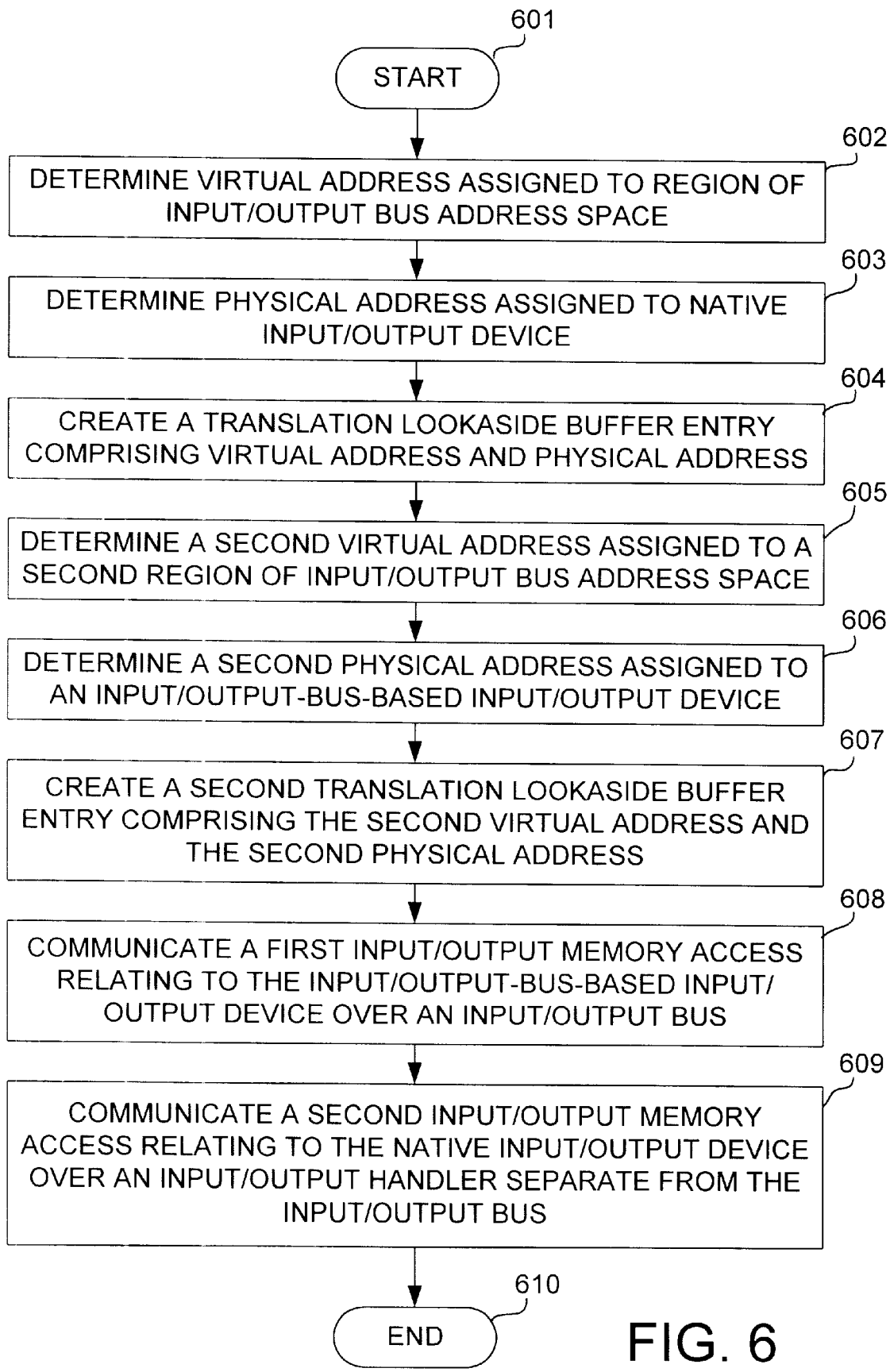
FIG. 6 is a flow diagram illustrating a process according to an embodiment of the invention.

FIG. 6 is a flow diagram illustrating a process according to an embodiment of the invention. The process begins in step 601. In step 602, a virtual address assigned to a region of the I/O bus address space is determined. In step 603, a physical address assigned to a native I/O device is determined. In step 604, a translation lookaside buffer entry comprising the virtual address and the physical address is created.

In step 605, a second virtual address assigned to a second region of the I/O bus address space is determined. In step 606, a second physical address assigned to an I/O-bus-based I/O device is determined. In step 607, a second TLB entry comprising the second virtual address and the second physical address is created.

In step 608, a first I/O memory access relating to the I/O-bus-based I/O device is communicated over the I/O bus. In step 609, the second I/O memory access relating to the native I/O device is communicated over an I/O handler separate from the I/O bus. In step 610, the process ends.

Figure 7:
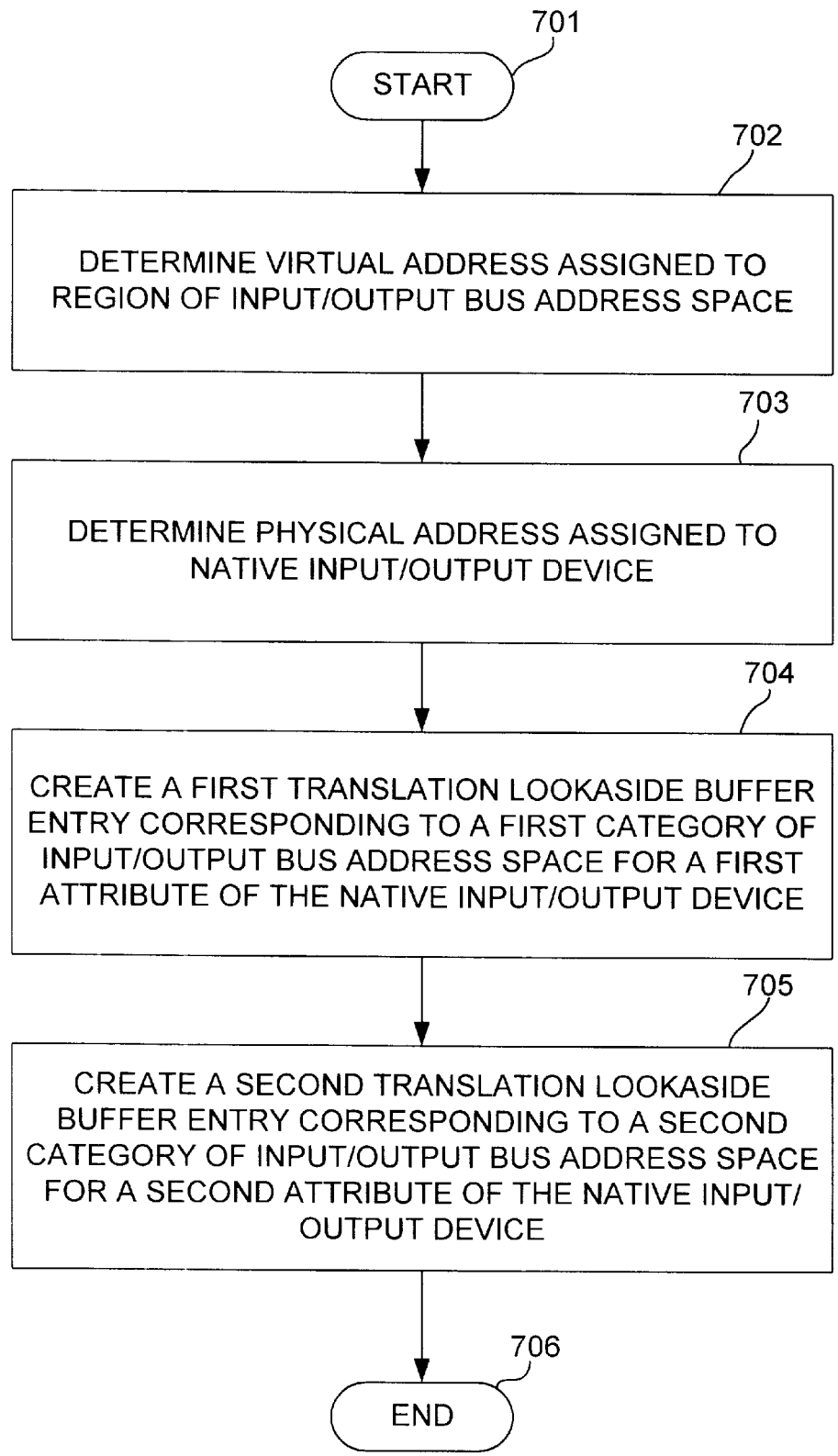
FIG. 7 is a flow diagram illustrating a process according to an embodiment of the invention.

FIG. 7 is a flow diagram illustrating a process according to an embodiment of the invention. The process begins in step 701. In step 702, a virtual address assigned to a region of I/O bus address space is determined. In step 703, a physical address assigned to a native I/O device is determined. In step 704, a first TLB entry corresponding to a first category of I/O bus address space is created for a first attribute of the native I/O device. In step 705, a second TLB entry corresponding to a second category of I/O bus address space is created for a second attribute of the native I/O device.

FIG. 8 is a flow diagram illustrating a process according to an embodiment of the invention. The process begins in step 801. In step 802, a first TLB entry is created that includes a first virtual address associated with the I/O bus and a first physical address associated with the I/O-bus-based I/O device. In step 803, a second TLB entry is created that includes a second virtual address associated with the I/O bus and a second physical address associated with the native I/O device. In step 804, a first access to the I/O-bus-based I/O device is directed over the I/O bus using the first TLB entry. In step 805, a second access to the native I/O device is directed over an I/O handler separate from the I/O bus using the second TLB entry. In step 808, the process ends.

An embodiment of the invention provides an apparatus for providing access to a native I/O device, such as I/O device X' 208. This apparatus comprises a CPU 203. The CPU 203 generates an access request to access the I/O device X' 208. An I/O processor, such as I/O gateway 205, is coupled to the CPU 203 and receives the access request from the CPU 203.

The apparatus also comprises an I/O bus 215 coupled to the I/O processor. The I/O bus 215 communicates the access request to an I/O-bus-based I/O device, such as external I/O device 212, if the access request relates to the I/O-bus-based I/O device coupled to the I/O bus 215.

The apparatus also comprises an I/O handler, such as DMA engine 206, coupled to the I/O processor and to the native I/O device. The I/O handler communicates the access request if the access request relates to the native I/O device.

As one alternative of the apparatus described above, the CPU 203 is provided with a TLB 204. The TLB 204 translates between a virtual address space and a physical address space. The TLB 204 identifies a first physical address related to the I/O-bus-based I/O device if the access request pertains to the I/O-bus-based I/O device and a second physical address related to the native I/O device if the access request pertains to the native I/O device.

As another alternative of the apparatus described above, the TLB 204 identifies a first virtual address corresponding to the I/O bus 215 if the access request pertains to the I/O-based I/O device and a second virtual address corresponding to the I/O bus 215 if the access request pertains to the native I/O device.

What is claimed is:

1. A method for allocating a region of input/output bus address space to a native input/output device comprising the steps of:

determining a virtual address assigned to the region of input/output bus address space;

determining a physical address assigned to the native input/output device; and creating a translation lookaside buffer entry comprising the virtual address and the physical address.

2. The method of claim 1 wherein the step of creating a translation lookaside buffer entry comprising the virtual address and the physical address further comprises the steps of:

creating a first translation lookaside buffer entry corresponding to a first category of input/output bus address space for a first attribute of the native input/output device; and creating a second translation lookaside buffer entry corresponding to a second category of input/output bus address space for a second attribute of the native input/output device.

3. The method of claim 1 further comprising the steps of:

determining a second virtual address assigned to a second region of input/output bus address space;

determining a second physical address assigned to an input/output-bus-based input/output device; and creating a second translation lookaside buffer entry comprising the second virtual address and the second physical address.

4. The method of claim 3 further comprising the steps of:

communicating a first input/output memory access relating to the input/output-bus-based input/output device over an input/output bus; and communicating a second input/output memory access relating to the native input/output device over an input/output handler separate from the input/output bus.

5. A method for communicating with an input/output-bus-based input/output device and a native input/output device comprising the steps of:

directing a first access to the input/output-bus based input/output device over an input/output bus using a first translation lookaside buffer entry; and directing a second access to the native input/output device over an input/output handler separate from the input/output bus using a second translation lookaside buffer entry.

6. The method of claim 5 further comprising the steps of:

creating the first translation lookaside buffer entry that includes a first virtual address associated with the input/output bus and a first physical address associated with the input/output-bus-based input/output device; and creating the second translation lookaside buffer entry that includes a second virtual address associated with the input/output bus and a second physical address associated with the native input/output device.

7. Apparatus for providing access to a native input/output device comprising:

a central processing unit for generating an access request;

an input/output processor coupled to the central processing unit for receiving the access request from the central processing unit;

an input/output bus coupled to the input/output processor for communicating the access request if the access request relates to an input/output-bus-based input/output device coupled to the input/output bus; and an input/output handler coupled to the input/output processor and to the native input/output device for communicating the access request if the access request relates to the native input/output device.

8. The apparatus of claim 7 wherein the central processing unit is provided with a translation lookaside buffer for translating between a virtual address space and a physical address space, said translation lookaside buffer identifying a first physical address related to the input/output-bus-based input/output device if the access request pertains to the input/output-bus-based input/output device and a second physical address related to the native input/output device if the access request pertains to the native input/output device.

9. The apparatus of claim 7 wherein the translation lookaside buffer identifies a first virtual address corresponding to the input/output bus if the access request pertains to the input/output-bus-based input/output device and a second virtual address corresponding to the input/output bus if the access request pertains to the native input/output device.

* * * * *